(12) United States Patent
Pixton

(10) Patent No.: US 10,359,524 B2
(45) Date of Patent: Jul. 23, 2019

(54) INTERACTIVE SALT MODEL MODIFICATION

(71) Applicant: CONOCOPHILLIPS COMAPNY, Houston, TX (US)

(72) Inventor: John Linn Pixton, Katy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 15/299,949

(22) Filed: Oct. 21, 2016

(65) Prior Publication Data

US 2017/0115412 A1  Apr. 27, 2017

Related U.S. Application Data

(60) Provisional application No. 62/246,959, filed on Oct. 27, 2015.

(51) Int. Cl.
| | | |
|---|---|---|
| *G06F 19/00* | (2018.01) | |
| *G01V 1/28* | (2006.01) | |
| *G01V 1/34* | (2006.01) | |

(52) U.S. Cl.
CPC .............. *G01V 1/282* (2013.01); *G01V 1/345* (2013.01); *G01V 2210/64* (2013.01); *G01V 2210/74* (2013.01)

(58) Field of Classification Search
CPC .. G01V 99/005; G01V 2210/64; G01V 1/302; G06T 17/05
USPC ...................................... 702/13–16, 182–185
See application file for complete search history.

(56) References Cited

U.S. PATENT DOCUMENTS

| | | |
|---|---|---|
| 6,313,837 B1 | 11/2001 | Assa et al. |
| 6,829,570 B1 | 12/2004 | Thambynayagam et al. |
| 8,050,892 B2 | 11/2011 | Hartman |
| 8,442,770 B2 | 5/2013 | Bruun et al. |
| 8,743,115 B1 | 6/2014 | Mallet et al. |
| 2006/0089806 A1 | 4/2006 | Fitzsimmons et al. |
| 2007/0182762 A1 | 8/2007 | Wu et al. |
| 2011/0048731 A1 | 3/2011 | Imhof et al. |
| 2012/0150501 A1 | 6/2012 | Wu |
| 2013/0235696 A1 | 9/2013 | Larsen et al. |
| 2014/0222403 A1* | 8/2014 | Lepage ................ G01V 99/005 703/6 |
| 2014/0358445 A1 | 12/2014 | Imhof et al. |
| 2015/0254567 A1 | 9/2015 | Imhof |
| 2016/0103246 A1* | 4/2016 | Freeman .............. G01V 99/005 703/10 |

(Continued)

FOREIGN PATENT DOCUMENTS

WO  2014186479 A2  11/2014

OTHER PUBLICATIONS

International Search Report for PCT/US2016/058160 dated Dec. 30, 2016; 3 pgs.

*Primary Examiner* — Edward Raymond
(74) *Attorney, Agent, or Firm* — ConocoPhillips Company

(57) ABSTRACT

A method for making changes to a salt model are described. In particular, an algorithm allows a user to interactively edit a salt model to reflect migrated seismic data to improve model accuracy without having to select horizons that overlap or are sealed or decrease the resolution of the horizons. Instead, sealed horizon pairs are automatically generated from the edited data using a new algorithm.

20 Claims, 10 Drawing Sheets

(56) References Cited

U.S. PATENT DOCUMENTS

2016/0104317 A1* 4/2016 Salman ................ G06T 17/005
                                                          345/420

* cited by examiner

| | |
|---|---|
| 701. | Load Seismic Data for context |
| 702. | Select Horizon Pairs that define the salt model and load into plugin. The plugin will build an initial internal model. |
| 703. | Plugin sends horizon pairs to visualization to create a rendering of the salt model for the user. |
| 704. | User now enters an interactive session. During the session the user can perform the following actions (a-d) in any order:<br>a) Mark a new control point. If it is the first point, the plugin will respond by creating a proposed mesh that passes through the point and connects to the surface. If not the first point, the mesh fragment and proposed mesh are updated to pass through the new point.<br>b) Move a control point.<br>c) Delete an existing control point.<br>d) Tune mesh-generation parameters. |
| 705. | User can commit the change to the model (save). This will update the model and generate new sealed horizon pairs. The user returns to step 703 or 704 and repeats as often as needed to generate a satisfactory model. |
| 706. | When no further edits are desired, the sealed horizon pairs can be saved and used to build a new velocity model, which in turn can be used to re-migrate the seismic data and compare it with the original data. |

FIG. 7

INTERACTIVE SALT MODEL MODIFICATION

PRIOR RELATED APPLICATIONS

This application is a non-provisional application which claims benefit under 35 USC § 119(e) to U.S. Provisional Application Ser. No. 62/246,959 filed Oct. 27, 2015, entitled "INTERACTIVE SALT MODEL MODIFICATION," which is incorporated herein in its entirety.

FIELD OF THE DISCLOSURE

The disclosure generally relates to the field of seismic prospecting. In particular, the disclosure describes methods for accelerating construction of salt structure models.

BACKGROUND OF THE DISCLOSURE

A salt dome is a mound or column of salt that has risen toward the surface because it has a density that is lower than the rock above it. When a layer of salt is deposited on the floor of an evaporating body of water, it has a specific gravity of about 2.2. Other sedimentary rocks such as shale and limestone have lower specific gravities when they are deposited because the mud that they form from contains a significant amount of water. As the depth of burial increases, the specific gravity of salt remains about the same, but the specific gravity of shale and limestone increases as the water is squeezed from their pore spaces. Eventually the shale and limestone might have a specific gravity of 2.4 to 2.7, which is significantly higher than the salt. That creates an unstable situation where a lower specific gravity material such as salt is capable of behaving like a fluid and can move upwards.

As the salt moves up towards the surface, it can penetrate and/or bend strata of existing rock with it. As these strata are penetrated, they are generally bent slightly upwards at the point of contact with the dome, and can form pockets where petroleum and natural gas can collect between impermeable strata of rock and the salt.

Salt domes were almost unknown until an exploratory oil well was drilled on Spindletop Hill near Beaumont, Tex. in 1900 and completed in 1901. Spindletop was a low hill with a relief of about 15 feet where a visitor could find sulfur springs and natural gas seeps. At a depth of about 1000 feet, the well penetrated a pressurized oil reservoir that blew the drilling tools out of the well and showered the surrounding land with crude oil until the well could be brought under control. The initial production from the well was over 100,000 barrels of crude oil per day—a greater yield than any previous well had ever produced. Thus, from the earliest days of exploration, prospectors have associated salt with oil and gas wells.

In fact, salt is one of the most effective agents in nature for trapping oil and gas. It is a ductile material allowing it to move and deform surrounding sediment to create traps; yet, salt is also impermeable to hydrocarbons and acts as a seal. Salt's plasticity allows it to move in an upward motion creating pockets where crude oil and natural gas can seep in and remain trapped once the salt eventually dries. As such, most of the hydrocarbon in North America is trapped in salt-related structures. However, until the 1980s, it was uncommon for explorers to seek out hydrocarbons under the salt structures. An increased focus on imaging salt structures has opened the door for exploration below these structures.

Seismic prospecting techniques are commonly used to search for and evaluate of hydrocarbon deposits located in subterranean formations, including salt structures. In seismic prospecting, seismic energy sources are used to generate a seismic signal, which propagates into the earth and is at least partially reflected by subsurface seismic reflectors. Such seismic reflectors typically are interfaces between subterranean formations having different elastic properties. The reflections are caused by differences in elastic properties, specifically wave velocity and rock density, which lead to differences in impedance at the interfaces. The reflections are recorded by seismic detectors at or near the surface of the earth, in an overlying body of water, or at known depths in boreholes. The resulting seismic data is processed to yield information relating to the geologic structure and properties of the subterranean formations and potential hydrocarbon content.

However, many difficulties exist in imaging salt structures, particularly in both its plastic properties and in the three dimensional structure of the salt dome. For instance, the top part of the salt structure almost always overshadows the traps, essentially putting them in a "shadow zone", most particularly beneath salt flanks. Additionally, the salt acts as a barrier and scatters the seismic waves used to build an image of the subsurface. Thus, accurate visualization of the salt structure requires time-consuming computer interpolation and rendering.

To maximize the understanding of the position of seismic reflectors near and below salt structures, it is necessary to build an accurate model of the salt structure itself, especially the bottom of the salt. Today, the accuracy of a salt model is examined according to the quality of the migrated seismic imagery under the salt structures. If an area of seismic has poor quality or indicates questionable seismic features, the salt model is modified slightly, and seismic data re-migrated using that new salt model. This iterative process is repeated in an attempt to maximize the quality (and from that the accuracy) of the migrated seismic record. It is critical to have confidence in the geology surrounding salt structures for effective prospect evaluation.

The modify-remigrate-analyze step sequence is often referred to as an iteration. This iterative process is described below:

1. Make an estimate of the 3D salt model.
2. From the estimated 3D salt model, apply a migration technique to generate a new migrated seismic data.
3. Perform a qualitative analysis on the migrated seismic data, identifying areas that suggest the salt model above is incorrect or determining that no further changes are needed.
4. Make small changes to the 3D salt model in an effort order to improve the quality of the migrated seismic data.
5. Go to step 2 and repeat.

The iterative process is quite slow and current methods of imaging salt do not permit fast and precise changes in the salt model in Step 4. Model changes are currently made by careful line-by-line reinterpretation of all affected horizons using standard 2D interpretation tools. This is an extremely time-consuming process, and produces mixed results.

Some commercially available software such as LANDMARK® (from HALLIBURTON®) and PETRAL® (SCHLUMBERGER®) requires conversion of top/bottom horizon pairs to a triangle mesh representing the boundary. The geometry model is then simplified and subsequently interactively deformed by manipulating the points on the existing geometry. The result is then converted back to horizon pairs. This approach causes loss of precision over the whole structure in order to make a small change.

GX Technologies™ has developed a technique in which a geometric surface is interactively pushed and pulled into a desired shape. Other tools perform basic deformation of single horizons, but lack the ability to deform the model horizontally, work well at areas of high dip, and/or lack the information about 3D salt boundary.

Thus, there exists a need for methods of accelerating the salt modeling process, while maintaining an accurate depiction of the salt structure. Ideally, the method will facilitate making small changes in the 3D salt model to improve the model.

SUMMARY OF THE DISCLOSURE

The present application describes algorithms, methods and systems that accelerate the process of making small changes to the 3D salt model boundary in Step 4 above. Specifically, the method moves boundaries in 3D salt models, not by attempts to perturb the existing salt structure boundary, but rather by adding to and removing from the volume of the model at high resolution and with high precision.

Although specifically exemplified using 3D models of salt structure, the method has a more general applicability to any collection of geobodies. However, it is particularly helpful for use with salt structures, which have unusual seismic properties that can confound data analysis.

In more detail, a novel software algorithm allows a user to deform a 3-dimensional structure interactively by specifying one or more 3-dimensional target positions that the surface of the deformed model must intersect. The operation is carried out on a 3-dimensional salt model defined by one or more high-resolution horizon pairs. As each point is marked, a smooth surface fragment is updated, and a new, smooth proposed surface edit is constructed automatically that intersects the marked positions exactly and smoothly connects to the existing model.

The algorithm gives the user control over properties that govern the automatic construction of the mesh of the deformed 3D model. This allows the user to edit the mesh to further refine the new proposed boundary of the deformed model. Once the proposed boundary edit has been refined to the user's satisfaction, the original 3D model can be updated using a combination of boolean operations to incorporate the new surface represented by the mesh. The improved 3D model can then be used to generate sealed horizon pairs suitable for input to a e.g. velocity flooding software or other tools used in modeling sub-salt formations.

The present algorithms, methods and systems have the potential to speed up the model building process by accelerating the making of small changes to the model boundary. This in turn can improve the rate at which modeling can be achieved, leading to improved salt model accuracy, improved migrated seismic quality, and reduced time to achieve the same level of quality. Furthermore, the outputs of the algorithm can be used in other software system for model other facets of sub-salt structure such as seismic velocity modeling.

This method affords several other advantages and features over the traditional modeling methods:

First, interpretation using traditional methods works on a line-by-line basis in which the horizons are picked from 2D seismic survey. The present method naturally extends that technique to 3D, thus users familiar with traditional interpretation will already be familiar with the idea of picking 3D target positions on rendered seismic data. This will decrease the learning curve and user error rate.

Second, in traditional interpretation tools, the interpreter has to exercise care when picking horizons for salt model definition to ensure that top and bottom horizons overlap one another, forming a sealed 3D area. This additional interpretation and maneuvering increases modeling time. When using the present method, the user can focus on directing precise changes to the model boundary, and allow the software to transform those requirements into smooth edit mesh, and let the software handle horizon generation and sealing. The software will automatically generate a minimum number of horizon top/bottom pairs from the marked boundary that are collectively sealed and suitable for input to the velocity flood module.

In traditional interpretation, care must also be taken to ensure that the interpretation of the model makes sense and ties well both in the picked direction and in the direction perpendicular to it. The present method ensures tying by employing smooth surface connections between target points and the model surface mathematically. Further, the algorithms are not sensitive to either 3D orientation or point sparseness at a high dip. The editing operation and precision is the same regardless of whether the user is adjusting a boundary of low dip or a near-vertical or vertical boundary.

Finally, the user can mark just a few target points in a short amount of time, and let the computer generate most of the surface, or the user can exercise more control over surface by marking more target points. This gives the user control over the tradeoff between speed and precision.

The present method works directly with full-resolution horizon data. Its output of sealed horizon pairs can be used directly by velocity flood programs or other tools. It is also not necessary or desirable to convert the output of the currently described technique to and from another representation through a process (e.g. conversion to simplified triangle mesh) that could distort the original full-resolution salt model.

Because the current method reads in horizon pairs, which are likely to have been picked in a traditional manner with respect to overlapping top and bottom pairs, builds an internal salt model, and generates sealed horizons automatically, it can serve as a tool to filter out portions of the horizon pairs that don't contribute to the salt model (i.e. unnecessary overlaps, areas where the bottom is above the top). Thus, a very clean minimal set of sealed horizons representing the salt model boundaries can be produced with little or no data distortion or loss.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is herein, and generally conceived to be, a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

Unless specifically stated otherwise as apparent from the following discussion, it is appreciated that throughout the description, discussions utilizing terms such as "processing" or "computing" or "generating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes of modeling, or it may comprise a general-purpose computer selectively activated or reconfigured by a 3D modeling computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

In one embodiment, the computer system or apparatus may include graphical user interface (GUI) components such as a graphics display and a keyboard, which can include a pointing device (e.g., a mouse, trackball, or the like, not shown) to enable interactive operation. The GUI components may be used both to display data and processed data products and to allow the user to select among options for implementing aspects of the method. The computer system may store the results of the methods described above on disk storage, for later use and further analysis. Additionally, the computer system may include on or more processor for running said modeling program and algorithms.

The algorithm is currently implemented as a plug-in to GEOPROBE®, a LANDMARK GRAPHICS CORPORATION visualization system, though the algorithm implementation could be ported to other visualization systems. However, the algorithms and displays presented herein are not necessarily related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present algorithms and methods are described without reference to any particular programming language. It will be appreciated that a variety of programming languages may be used to implement the teachings as described herein.

In more detail, the invention includes any one or more of the following embodiments in any combination:

A computer-implemented method for modeling a geobody in a reservoir comprising:
a) uploading seismic data from a reservoir containing a geobody structure into a 3D modeling program in a computer;
b) generating a cube display model of said geobody structure having horizons inserted into the cube display model volume;
c) applying an algorithm to said 3D modeling program that automatically selects sealed horizon pairs and that automatically smooths and connects a mesh representation of said cube display model or portions thereof;
d) selecting with said algorithm a set of sealed horizon pairs in said cube display model to define a volume representing a geobody model having a boundary and internal features and displaying said geobody model on a display;
e) evaluating said seismic data and said displayed geobody model to identify an area in said displayed geobody model that needs to be improved;
f) marking on said displayed geobody model at least one user-selected point to adjust the geobody model in said area and automatically generating a smoothed mesh that intersects said at least one user-selected point;
g) expanding said smoothed mesh to connect to said geobody model;
h) updating the geobody model to incorporate said smoothed mesh to form an updated geobody model;
i) generating with said algorithm a set of updated sealed horizon pairs for said updated geobody model and storing said set of updated sealed horizon pairs in a memory in said computer;
j) repeating one or more of steps until a user determines that the updated geobody model is satisfactory, and
k) using said updated geobody model in producing fluids from said reservoir.

A method as herein described, wherein said algorithm selects sealed horizon pairs by:
a. creating a stack count array;
b. walking the stack count array and assigning a unique number to each connected area containing the same number of Z value pairs that match a user-defined fitting criteria;
c. assigning numerical patch identifiers to each Z value pair;
d. compared adjacent numerical patch identifiers;
e. connecting patches in order of connection strength;
f. assigning each set of connected patches to a horizon pair; and
g. sealing horizon pairs by applying a 3×3 digital filter that scans top horizons for a null value and replaces each null value with a average of neighboring non-null top and bottom values.

A method as herein described, wherein said sealed horizon pairs are chosen to define said volume.

A method as herein described, wherein one or more boundaries of said geobody model are being corrected.

A method as herein described, wherein an internal feature of said geobody model is being corrected.

A method as herein described, wherein Boolean operations are used to incorporate said smoothed mesh into said salt model.

A computer-implemented method for modifying a model of a salt structure in a reservoir, comprising:
a. uploading seismic data from a reservoir containing a salt structure into a 3D modeling program on a computer and generating a cube display model having horizons inserted into the model volume;
b. selecting at least one top and one bottom horizon pair in said cube display model to define a volume representing a salt model having a boundary and displaying said salt model on a display;
c. comparing said seismic data and said displayed salt model to identify at least one incorrect area on the boundary of said salt model;
d. marking on said displayed salt model at least one point in said incorrect area of said displayed salt model to generate a mesh that intersects said at least one point in said incorrect area;
e. expanding said mesh to connect to said salt model and creating an updated salt model;
f. automatically generating a set of sealed horizon pairs for said updated salt model and storing said set of sealed horizon pairs in a memory in said computer;

g. repeating one or more of steps until a user is satisfied with the updated salt model;
h. storing said updated salt model in said computer; and
i. using said updated salt model in producing fluids (oil, gas, water, etc.) from said reservoir.

A method as herein described, wherein the step of automatically generating a set of sealed horizon pairs comprises:
a. creating a stack count array;
b. walking the stack count array and assigning a unique number to each connected area containing the same number of Z value pairs that match a user-defined fitting criteria;
c. assigning numerical patch identifiers to each Z value pair;
d. compared adjacent numerical patch identifiers;
e. connecting patches in order of connection strength;
f. assigning each set of connected patches to a horizon pair;
g. sealing horizon pairs by applying a 3×3 digital filter that scans top horizons for a null value and replaces each null value with a average of neighboring non-null top and bottom values.

A method as herein described, wherein the marking step can include one or more of the following:
a. marking a new control point;
b. moving a control point;
c. deleting a control point; or
d. tuning mesh-generation parameters.

A computer-implemented method for modifying a model of a salt or other geobody structure, comprising:
a. marking at least one point in an incorrect area of a displayed salt or geobody model in a computer to generate a mesh that intersects said at least one point in said incorrect area;
b. expanding said mesh to connect to said salt or geobody model thus creating an updated model;
c. automatically generating a set of sealed horizon pairs for said updated model and storing said set of sealed horizon pairs in a memory disk in said computer, wherein said sealed horizon pairs are generated by:
d. creating a stack count array;
e. walking the stack count array and assigning a unique number to each connected area containing the same number of Z value pairs that match a user-defined fitting criteria;
f. assigning numerical patch identifiers to each Z value pair;
g. compared adjacent numerical patch identifiers;
h. connecting patches in order of connection strength;
i. assigning each set of connected patches to a horizon pair;
j. sealing horizon pairs by applying a 3×3 digital filter that scans top horizons for a null value and replaces each null value with a average of neighboring non-null top and bottom values;
k. repeating at least the first two steps until a user is satisfied with the updated model; and
l. using said updated salt model in producing fluids (oil, gas, water, etc.) from said reservoir.

A method as herein described, wherein said fitting criteria is 3-5 criteria.

Any method described herein, including the further step of printing, displaying or saving the results of the method. A printout or 3D display of the results of the method.

A non-transitory machine-readable storage medium containing or having saved thereto the results of the method.

Any method described herein, further including the step of using said results in a reservoir modeling program to predict reservoir performance characteristics, such as fracturing, production rates, total production levels, rock failures, faults, wellbore failure, and the like.

Any method described herein, further including the step of using said results to design and implement a reservoir drilling, development, production or stimulation program.

A non-transitory machine-readable storage medium, which when executed by at least one processor of a computer, performs the steps of the method(s) described herein.

As used herein, "mesh" means a collection of vertices, edges and faces that defines the shape of a polyhedral object in 3D computer graphics and solid modeling. Typically mesh shapes include convex polygons, triangles, and quadrilaterals but can also include concave polygons and polygons with holes. In this particular application, the algorithm will generate a proposed mesh that the user can edit when modifying the topography of the salt model.

As used herein "smoothing" or "mesh smoothing" refers to those algorithms designed to smooth a surface from polygonal meshes to a visual representation that more closely approximates true surfaces, capturing important patterns in the data, while leaving out noise or other fine-scale structures phenomena.

There are many such smoothing algorithms available, including e.g., Laplacian smoothing, additive smoothing, Butterworth filter, Digital filter, Kalman filter, Kernel smoother, Stretched grid method, Low-pass filter, Savitzky-Golay smoothing filter based on the least-squares fitting of polynomials to segments of the data, Local regression also known as "loess" or "lowess", Smoothing spline, Ramer-Douglas-Peucker algorithm, and the like.

As used herein, "horizon" refers to a seismic reflection event that is a particular geological boundary, such as the contact between two bodies of rock having different seismic velocity, density, porosity, fluid content or all of those. In seismic surveying, horizon denotes a surface in or of rock, or a distinctive layer of rock that might be represented by a reflection. "Horizon pairs" refers to a pair of horizons bounding an area, e.g., a top and bottom horizon. "Sealed horizons" refer to horizons that are continuous, such that a 3D space is contained thereby, e.g., there are no gaps.

As used herein, a "stack count array" is a mathematical array or matrix that matches the X,Y size of the 3D seismic survey such that the number of stacking intervals in each X,Y survey bin in the model is recorded in the corresponding X,Y cell of the array.

As used herein "region map", is another array that is created by walking the stack count array and assigning a unique number to each connected area containing the same number of Z value pairs that match a "fitting criteria".

An array "walk" is applying a user supplied function to every member of an array.

The "fitting criteria" is user set and is typically set at about 3-5, and that the Z value pairs must be within the fitting criteria—If not, then the algorithm treats the Z value pairs as identifying two adjacent salt structures, rather than one.

As used herein "patches" refers to an area of contiguous structure in a model.

As used herein a "3×3 digital filter" refers to a mathematical filter that scans the top horizon for a null value that has one or more non-null neighboring values, replaces the null value with the average of neighboring non-null top and bottom values.

As used herein, "bins" refers to horizontal squares (or rectangles or parallelograms) that divide a 3D seismic survey.

As used herein a "cube display model" is a 3D visual representation of seismic data that is defined by individual cubes or cuboids.

As used herein, "seismic migration" refers to the geometric repositioning of the return signals of a seismic survey to show an event, such as a boundary or structure, where it is being hit by the seismic wave rather than where it is picked up by the detector. The migration step removes signal delays caused by traveling different distances to the various detectors, and collapses time delayed signals into one signal. It also moves dipping events to their correct positions, collapses diffractions, and increases spatial resolution.

As used herein, a "satisfactory" model is one that the seismic interpreter is believes to be suitable for further testing. However, testing may show that additional modifications may be needed, and the editing process can of course be repeated.

As used herein, reference to a step that is "automatically" performed, means that the software and/or plugin will immediately perform the needed step, and no user intervention or action is required.

As used herein, reference to a "user" may mean the seismic data interpreter or a programmer acting under the direction of the seismic data interpreter.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| E&P | Exploration and Production |

BRIEF DESCRIPTION OF THE DRAWINGS

FIG. 7 displays a flow chart of the method of updating a salt model.

DETAILED DESCRIPTION

Figure 1:
FIG. 1 displays an initial salt model with a proposed smoothing mesh for modifying the boundary of the salt model according to MODEL 1.

The disclosure provides a novel algorithm, methods, devices and systems for accelerating the salt modeling process by speeding up the ability to make a series of changes to the model during each iteration.

The present method uses an interactive software algorithm that enables the user to deform a 3-dimensional model by simply marking new 3-dimensional target positions directly on seismic sections that the surface of the deformed model must intersect. The algorithm then (1) smoothly connects marked points with a connected mesh fragment made of the point(s) the user marked, and (2) automatically generates a surface that smoothly connects the new mesh fragment with the existing model.

The breadth and density of the automatically generated mesh can be user controlled. The user can continue to add, move, remove points and tune the mesh generation parameters until a satisfactory edit has been achieved. The entire edit mesh can be further refined by pushing/pulling operations. When the user is satisfied with the edits, they can be saved and applied to the model. The update process generates a new set of horizon top/bottom pairs for display in GeoProbe, and the user can repeat the process to apply more edits.

A user with a basic understanding of this tool can create complex, smooth model boundary changes by marking just a few points (or even one) very quickly. This is much faster than using a traditional line-by-line reinterpretation. This approach to deformation by directly and interactively specifying target intersection points (that is, points through which the updated surface must pass through) is unique and may lead to a significant improvement in the rate at which accurate salt model changes can be made, and consequently reduced time of evaluation of the economics of potential prospects.

Complex structures and strong velocity contrast of salt with sediments is a challenge for seismic imaging algorithms, especially below the salt. To build an accurate model of the salt structure, the accuracy of the salt model is examined in accordance with the quality of the migrated seismic imagery of the salt model. Migration of seismic data involves moving dipping events to their correct positions, collapsing diffractions, increasing spatial resolution. Developing the migrated seismic imagery is probably the most important of all processing stages. If an area of the salt model has poor quality or questionable features when compared to the migrated seismic imagery, the salt model is modified slightly and a new migrated seismic imagery is generated. The salt model is repeatedly modified, re-migrated and compared with the new migrated seismic imagery to improve the quality of the migrated seismic data.

The bottleneck in the modeling process is making changes to the salt model. Use of horizons is essential when strong, visible velocity anomalies, such as salt domes and sills, are present and are thus used in analysis of such structures.

Unfortunately, horizons change shape and position every time a new model is part of a re-migration of the original input data. The processor is forced to either reinterpret a new set of horizons or to edit the existing set prior to another iteration of velocity analysis.

Interpreting a large number of horizons requires a considerable amount of human time and cost. Typically, model changes are made by careful line-by-line reinterpretation of all affected horizons using standard 2D interpretation tools. Some currently available software such as LANDMARK® and PETRAL® try to improve interpretation time by simplifying the horizons pairs to a geometric model, manipulating points on the geometric model, then converting the results back to the horizon pairs. However, these methods cause a loss of precision over the entire structure in an attempt to make small changes.

Other tools only perform changes on a single horizon, lack the ability to change the model horizontally, and/or do not work in areas of high dip or are unable to add new areas or remove existing areas. In salt model manipulation, it is important to be able to extend a shelf horizontally, join neighboring bodies, and or extend the model outward over areas that are poorly imaged by the existing model.

Furthermore, the interpreter has to exercise care when picking horizons in the salt model that need changing to ensure that the top and bottom horizons overlap one another and form a sealed 3D area. As such, much time is spent making precise changes to the salt model and, for some techniques, precision over the whole model is sacrificed.

The present method improves upon the 3D salt modeling process by accelerating the ability to make changes to the salt model. In particular, the changes to the horizon pairs in the salt model are performed automatically, without user intervention. The method also allows the user to control a variety of parameters used in the refinements of the horizon pairs being changed. Once the user is satisfied with the edits, the method will automatically generate sealed horizon pairs that will be sent to the interpretation software to be saved or used in further processing. This improvement will reduce the amount of time a user spends selecting horizons that overlap and formed sealed 3D areas and reduce user error in the modeling process.

Specifically, a computer-implemented algorithm and method for updating 3D models of salt structures are provided. During or after seismic interpretation, structural frameworks of the rock boundary, including faults, horizons, and zones, can be constructed and edited by the user. The edits can be accepted and incorporated into model and the algorithm will automatically generated sealed horizon pairs. Further changes can be made or new migrated seismic data can be generated. In the present method, accelerating changes to both the horizon boundary and internal structures is of interest.

The method and algorithm can be used with any 3D salt model having geological horizons, or intervals, inserted into the modeling volume. Furthermore, the algorithm can be installed and used on any 3D multi-volume interpretation and visualization software and utilizes the basic tools found within. The examples described were below were modeled using a plugin for GEOPROBE® from Landmark Software, but other programs such as PETREL® and the like can be used. Exemplary software includes, e.g., PETREL E&P®, PETROSYS®, OMEGA®, GEOPRO®, SEISWARE®, PARADIGM ECHOS®, GEOCRAFT®, and the like.

Further, the seismic processing and imaging software can be combined with other reservoir and geological modeling systems, such as geophysical model building, rock physics evaluation, and reservoir modeling, e.g., IBM® SYSTEM BLUE GENE/P® SOLUTION, the JASON™ software suite, JEWELSUITE, and the like.

A large list of free geophysics software is published at wikipedia.org/wiki/List_of_free_geophysics_software and is incorporated by reference herein in its entirety.

Preferably the hardware is optimized for seismic analysis, which is compute intensive. Hardware may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could be used but are less preferred since seismic data processing and imaging is already compute intensive.

For ease of understanding, the improved method of making changes to the salt model will be described before the specifics of the algorithm. Models generated by applying the methods to salt boundaries and internal salt structures will also be described. The following is intended to be illustrative only, and not unduly limit the scope of the appended claims.

Mesh Method

The method is applied to 3D salt models created on an apparatus from means known in the art, preferable those with horizons inserted into the modeling volume. This apparatus may be specially constructed for the required purposes of modeling, or it may comprise a general-purpose computer selectively activated or reconfigured by a 3D modeling computer program stored in the computer. Such a computer program may be stored in a computer readable storage medium. Ideally, the apparatus has one or more processors for operating the modeling program, generating the models and running the algorithm described in more detail below. The output from the method can be saved on the apparatus for further processing or for use in additional analytical techniques.

The basic steps in the method are displayed in FIG. 7 and described in more detail below.

701. Load one or more pairs of horizons representing the current salt model area and generate a cube display of the relevant 3D seismic data.

702. For deforming the 3D model, the first step is to choose one or more top and bottom horizon pairs to define the volume representing the initial salt model area. For each pair of top and bottom horizons chosen, the Z values for every X,Y seismic survey position is examined. If the top Z value is less than (above) the bottom Z value, the interval from the top Z value to the bottom Z value is added to the model. If the top Z value is greater than (below) the bottom Z value, no contribution to the model is performed. If both values are null, then no contribution is made. If the top is non-null and the bottom is null, then an interval from the top value to the maximum Z value is created. Similarly, if the top is null but the bottom is non-null, then an interval from the minimum Z value to the bottom Z value is added. Once the Z value intervals are added, new top and bottom horizon pairs are generated from the salt model.

703. The horizon pairs are sent to the visualization software for displaying and editing.

An interpreter compares the seismic data with the displayed salt model in 703 to identify areas of the model that need to be corrected or improved. This step requires interpretation skill and experience to determine what areas need improvement, and what strategy to employ to attempt to improve them.

704. A user then begins a model editing process, employing the algorithm described below. The user marks at least one target point that the salt model boundary should pass through, but is not currently passing through. This is typically accomplished by marking on the seismic section co-rendered with the salt model with a pointer or mouse. The algorithm will create a proposed mesh that is then smoothed and connected to the rest of the model, and that can be further edited by the user. As more points are marked, moved, or deleted the mesh is automatically updated. The user can also control parameters for the mesh generation, including extent, density, and connection to the surface.

The steps of this editing process in more detail are:

Step 1. The user marks 3-dimensional target positions, or points, using the available visualization software capability, typically on seismic sections co-rendered with the salt model. On a desktop with a traditional mouse and keyboard setup, this can be accomplished by (1) picking points on the surfaces of the displayed objects, typically seismic sections and/or existing horizons, or (2) adding a point $P=0+d*V$, where 0 is the origin, chosen on a surface, d is a defined distance from the surface, and V is the surface normal at 0. Certain virtual environment interfaces (e.g., wand or pointer tool) facilitate marking 3D positions directly on the model. Touch sensitive screens are another possibility, as are virtual pointers and the like. Other means such as specific keystrokes or combination of keys can mark the target position.

Points can be marked in any order, moved around, or deleted as needed. In other words, the order of the points is not important to the mesh-generation algorithm of the current method.

Step 2. As points are added, moved, and deleted, the algorithm constructs a smooth proposed edit mesh that intersects the current set of user-selected target points and smoothly connects them to the existing model surface.

Thus, the novel algorithm takes the user-selected target points and the existing original 3D model to create a new boundary for the salt model. The new boundary is represented as a typical mesh grid. User selectable parameters are available to control various aspects of the mesh generation, including extent, density, and connection to the surface.

Step 3. Local refinements to the new boundary can be made interactively to the proposed edit mesh. For example in the current implementation, the proposed boundary can be pushed and pulled by Gaussian shape according to a user-defined width.

If desired, push pull functions within the 3D software can be used for editing. The user can repeatedly select any vertex on the proposed mesh and push or pull it along its normal direction to refine the mesh position. The vertices on the mesh within a user-specified distance will move along their normal by an amount dampened by their distance to the center selected vertex according to a Gaussian function. The user can return to step 704, but may lose proposed mesh refinements, depending on how the program and/or plugin is structured.

705. Apply the edited proposed mesh to the salt model. The changes are typically topographical in nature and are applied to both the boundary of the salt model or the internal space. Thus, filling in or taking away areas depicted in the proposed edit mesh updates the salt model.

706. Once the original salt model is updated, sealed horizon pairs are generated automatically and saved. The updated sealed horizon pairs can be sent to the visualization or interpretation software, where the sealed horizon pairs used in further processing steps. This reduces the modeling time greatly because a user-selection of sealed horizon pairs is non-trivial and complicated.

707. One or more of the steps including 704 are repeated until the updated salt model resembles the migrated seismic data.

Edit step 704 can be repeated more than once, and those changes can be sequentially updated to the model, or held until all edits are complete and the model updated at one time. Thus, the user can edit the entire salt model in a single mesh or can modify the salt model in sections. Once the salt model accurately resembles the migrated seismic data, the updated salt model can be exported for additional analysis such as velocity modeling.

If additional changes are needed, then a new migration data set is generated for the new salt model and additional edits are made. This method is repeated until the salt model accurately reflects the migration data.

Algorithm

An important feature of the algorithm is the automatic generation of horizon pairs that provide both good visualization of the salt structure and are also properly sealed. This is a nontrivial task, especially when generating horizon pairs from the stacking model.

In more detail on how the horizon pairs are generated, an array called the 'stack count array' that matches the X,Y size of the 3D seismic survey is created. The number of stacking intervals in each X,Y survey bin in the model is recorded in the corresponding X,Y cell of the array.

A second array, the "region map", is created by walking the stack count array and assigning a unique number to each connected area containing the same number of Z value pairs that match a "fitting criteria". The fitting criteria is that the Z value pairs must be within a small number of sample intervals of overlap. If this criteria is not met, then the algorithm will consider it more likely that two adjacent salt structures are present but in close proximity.

In each region, numerical patch identifiers are assigned to each vertical layer (Z value pair). Adjacent regions are then compared to one another to determine whether or not each regions' patches can connect to one another, and how they should be connected.

A score reflecting the strength of connection is assigned to each patch-patch boundary, reflecting the total surface area of the connection between patches. The surface area is computed by summing Z overlap at region boundaries. Patches are connected in order of connection strength, without violating constraints that would make it impossible to create sealed horizons. Primary connections are made between the strongest connections. If there are secondary connections (e.g. 2 layers merging into a single layer), then these secondary connections are extended by one cell from the dependent patch into the primary patch to guarantee that the total area, as represented by the set of horizon pairs, is sealed.

Once patch connections are decided, each set of connected patches is assigned to a horizon pair. Multiple disconnected patches can be assigned to the same horizon pair as long as they do not violate a proximity constraint of 3 bin cell separation required for sealing. Next, top and bottom horizon data is extracted from the patch's Z value pairs and horizon assignment information.

After the data is extracted, the horizon pairs are sealed by using a 3×3 digital filter. The filter scans the top horizon for a null value that has one or more non-null neighboring values. For each such instance, the null value is replaced with the average of neighboring non-null top and bottom values. This has the effect of extending the horizon by one bin cell in all directions and sealing it without changing the stacking model that the velocity flood algorithm or other subsequent software tool would see.

The resulting sealed horizons are then sent to the visualization software. While the number of horizons generated and sent depends on the structure of the salt model, the minimum number of horizons sent will be equal to the maximum number of Z value pairs at one X,Y bin in the salt model.

The benefits of preparing a salt model using this algorithm include the use of full resolution horizon data. This provides for the most accurate salt model because precise changes to the full-resolution data can be made. Furthermore, the output of the algorithm can immediately be used in another processing tool, such as velocity flood modules.

Model Test 1

The algorithm and method was applied to a seismic survey of a salt structure found in an exemplary reservoir to modify the outer boundary surface. A 3D salt model was created from means commonly known in the art and horizons were inserted into the modeling volume.

A typical horizon in the Exploration and Production (E&P) domain contains either a valid time or depth value, or null (absent value) for each X, Y bin in the 3D seismic survey. The 3D salt structure model is then typically represented as a 2D array of zero or more pairs of Z values. Each cell of the array represents an X,Y position in a 3D seismic survey. Each pair of Z values represents a time or depth interval for which the salt structure is present for the given X,Y position. Outside those intervals, salt structure is absent. This representation was chosen to match standard E&P horizon representations and lends itself well to algorithms that can be parallelized while preserving the high-resolution details present in the horizon pair representation of the model.

The seismic survey was loaded into GEOPROBE® and a 3D model with horizons was generated. A top and bottom horizon pair was selected to define the initial salt model and uploaded into the visualization system. The migration technique native to GEOPROBE® generated migrated seismic data from the initial salt model.

Qualitative analysis of the migrated data identified areas in the salt model that could be improved. Typically areas where the salt model is not right correspond to areas in the migrated data that are of poor quality (i.e. unresolved) and/or suggest structures or events that are non-geological. Such analysis of the disparities in the salt model is commonly determined by those skilled in the art. If the user does not determine any improvements are needed, then no further changes are needed to the model and the model can undergo other processing, such as velocity model flooding, and the like.

However, if changes are needed, as is exemplified here, then the user will make changes to the model using the presently described method and algorithm instead of making changes line-by-line.

To make the necessary changes to improve the model, three-dimensional target positions are selecting using e.g., a wand tool. FIG. 1 displays the initial salt model (shades of green) intersecting the 3D seismic survey (pale block) and user-selected target positions (red dots) and resulting smooth mesh (yellow) patch utilizing triangular shapes, wherein the patch is predominantly topologically consistent. In this particular example, the patch is slightly raised above the initial salt model due to the values of Z in the target positions, e.g. Z values of the missing dipping area. In some models, selection target positions with a Z value that same as the initial salt model will be made if no topological changes are needed.

Figure 2:
FIG. 2 displays the proposed smoothing mesh expanded to connect to the initial salt model.

The smoothing mesh automatically expands to connect the target points to the initial salt model, as seen in FIG. 2, without user initiative. The user can alter many parameters of this connecting mesh after its initial generation. For instance, the user can control various aspects such as the extent of the mesh, the connection of the mesh to the surface of the horizon pair and the density of the mesh polygons.

Figure 3:
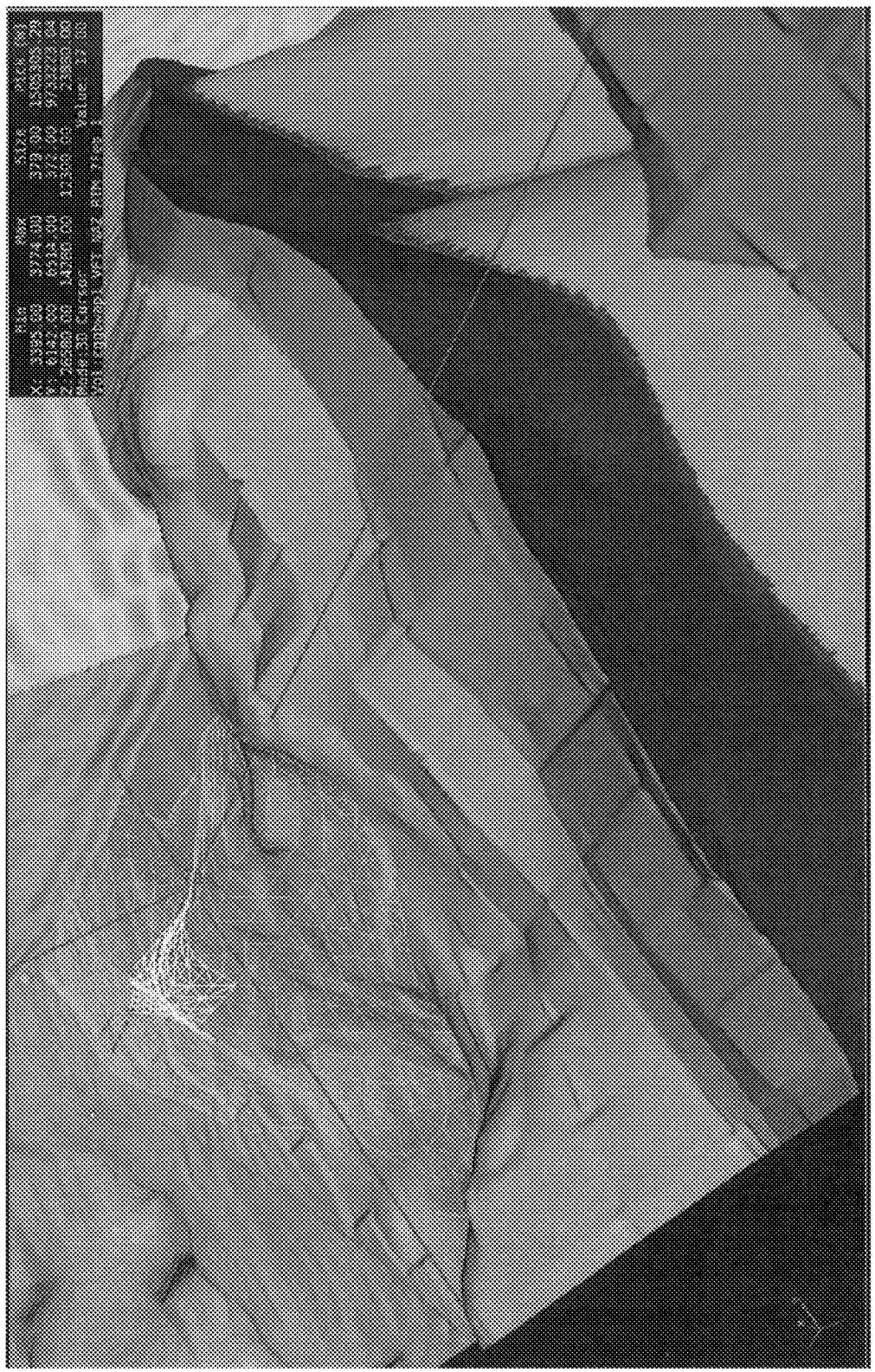
FIG. 3 displays user edits to the proposed smoothing mesh shown in FIG. 2.

FIG. 3 displays some of these modifications to the original mesh, in particular the location of the connection of the mesh to the surface has been modified and the surface under the mesh is enlarged. Due to the enlarged surface, the polygon density has also decreased.

Figure 4A:
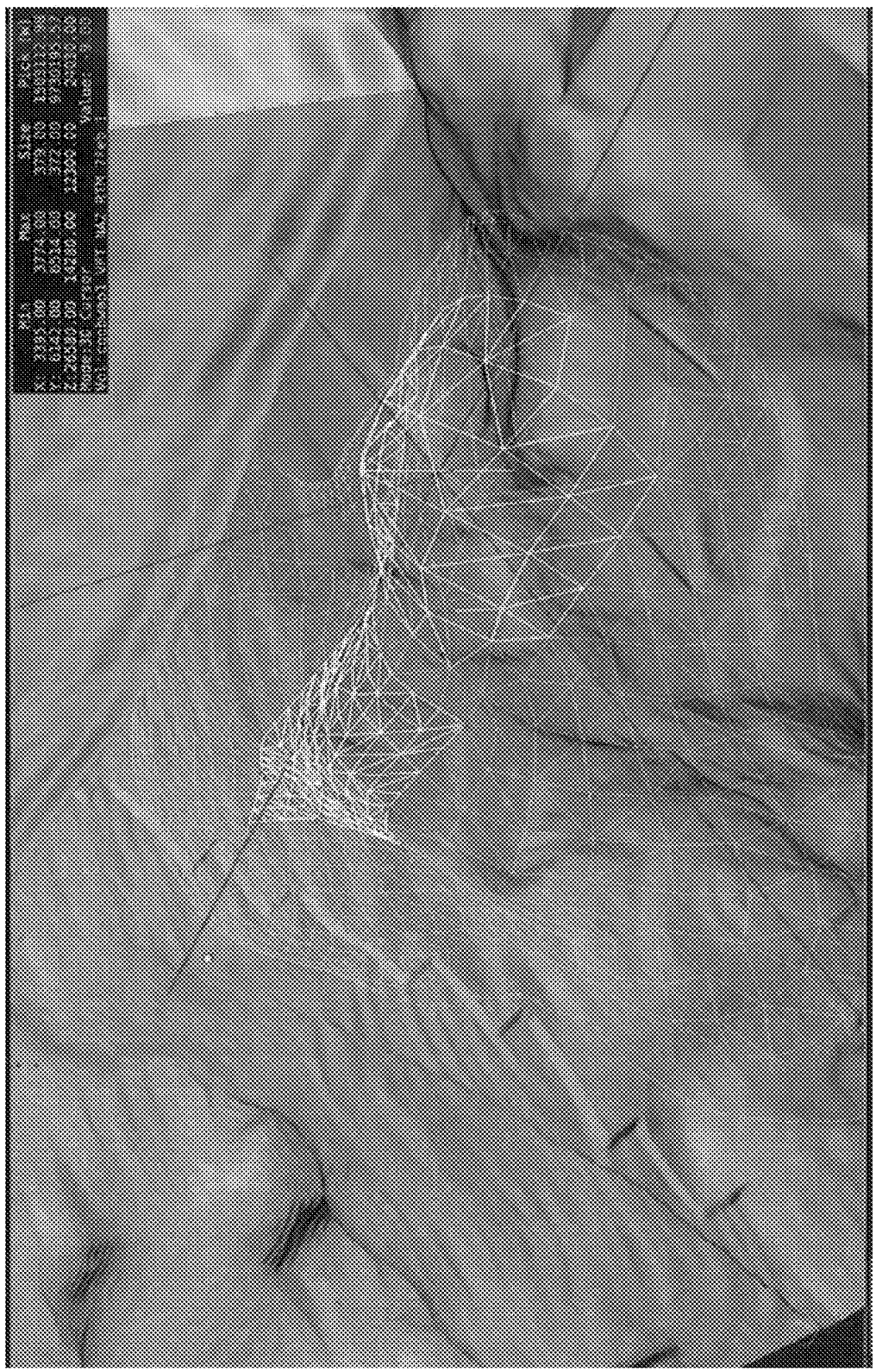
FIG. 4A displays user edits to the proposed smoothing mesh after use of a push/pull modeling tool.

In FIG. 4A, the mesh has also been pulled (or pushed) to define a second apex (yellow web without red target points) using the push/pull tool commonly found in most modeling software.

Figure 4B:
FIG. 4B shows incorporation of the user edits into the proposed smoothing mesh.

Once the user finishes editing the proposed mesh, the changes to the proposed mesh are incorporated into the proposed mesh. In practice, the modeling software displays this incorporation by e.g., a change in color of the web, as shown in FIG. 4B. Edits to the mesh are interactively made such that the edits can be incorporated to the mesh section by section. Furthermore, new edits can override previously incorporated edits as the user refines the mesh.

Figure 5A:
FIG. 5A illustrates the salt model being filled in to match the proposed smoothing mesh.
Figure 5B:
FIG. 5B shows FIG. 5A without the proposed smoothing mesh.

Once the local refinements to the proposed mesh are finished, the original salt model is updated by filling in or taking away areas between the boundary of the original salt model and the proposed mesh. As seen in FIG. 5A-B, the salt model of this sample was updated by filling in the new elevations from the proposed mesh. Once the model was updated, sealed horizon pairs were automatically generated and sent to the interpretative software in GeoProbe. The sealed horizon pairs can also be saved and used for further processing steps.

Though not shown, the modified salt model can be used to update the velocity model and generate new migrated seismic data for comparison and additional changes to the salt model can be made until the user is satisfied with the resulting seismic imagery.

While this example showed the addition of peaks, the proposed mesh can be used to make dips, crevices, tunnels, and bridges in the salt model such that the topography of the model accurately reflect the salt structure.

Figure 6A:
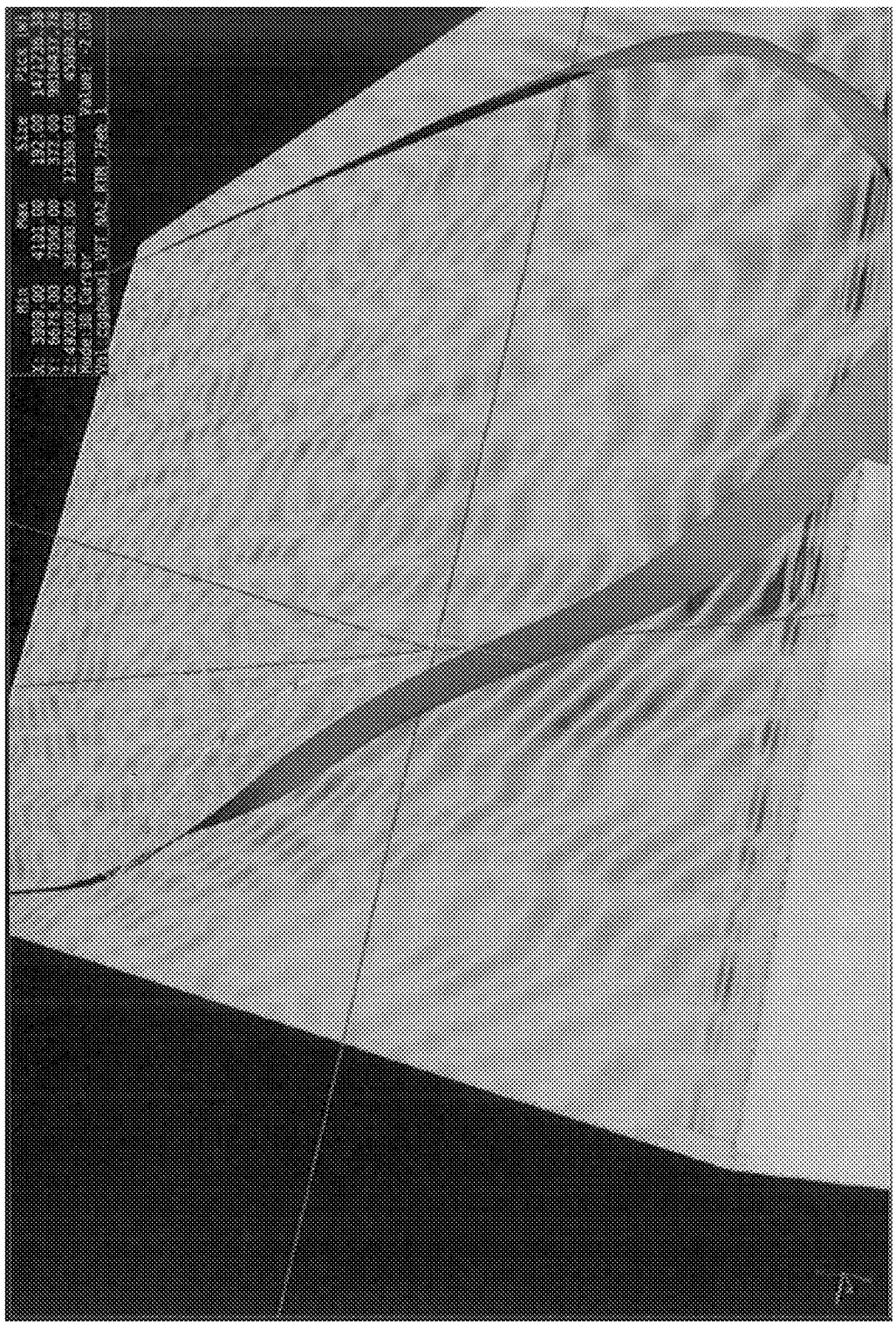
FIG. 6A displays the internal surface of the salt model with a proposed smoothing mesh for modifying the inner volume.
Figure 6B:
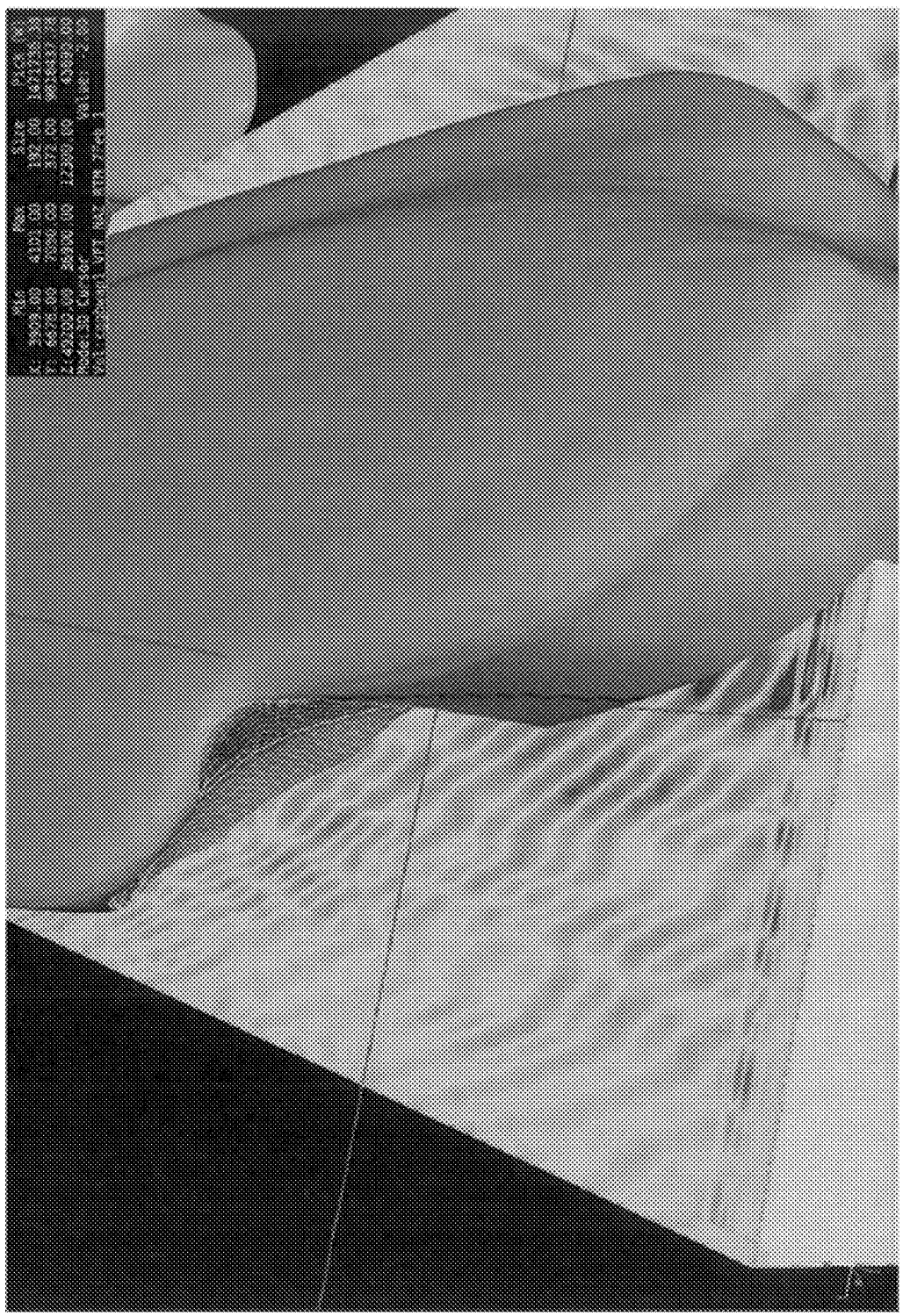
FIG. 6B shows the edited salt model from FIG. 6A.

In addition to the outer boundary surface, the presently described algorithm and methods can be used to alter areas inside the model. FIG. 6A displays a proposed mesh The foregoing disclosure and description of the disclosed methods and algorithm is illustrative and explanatory thereof. Various changes in the details of the illustrated construction can be made within the scope of the present claims without departing from the true spirit of the invention. Furthermore, while the above is exemplified using salt models, the disclosed methods and algorithm can be applied to any 3D modeling requiring minute changes. The present methods and algorithm should only be limited by the following claims and their legal equivalents.

The following references are incorporated by reference in their entirety for all purposes.

U.S. Pat. No. 8,442,770 Forming a geological model

U.S. Pat. No. 8,050,892 Method, device, computer program and data carrier for modeling a multidimensional heterogeneous structure, using a digital processing unit

The invention claimed is:

1. A computer-implemented method for modeling a geobody in a reservoir comprising:
   a) uploading seismic data from a reservoir containing a geobody structure into a 3D modeling program in a computer;
   b) generating a cube display model of said geobody structure having horizons inserted into the cube display model volume;
   c) applying an algorithm to said 3D modeling program that automatically selects sealed horizon pairs and that automatically smooths and connects a mesh representation of said cube display model or portions thereof;
   d) selecting with said algorithm a set of sealed horizon pairs in said cube display model to define a volume representing a geobody model having a boundary and internal features and displaying said geobody model on a display;
   e) evaluating said seismic data and said displayed geobody model to identify an area in said displayed geobody model that needs to be improved;
   f) marking on said displayed geobody model at least one user-selected point to adjust the geobody model in said area and automatically generating a smoothed mesh that intersects said at least one user-selected point;
   g) expanding said smoothed mesh to connect to said geobody model;
   h) updating the geobody model to incorporate said smoothed mesh to form an updated geobody model;
   i) generating with said algorithm a set of updated sealed horizon pairs for said updated geobody model and storing said set of updated sealed horizon pairs in a memory in said computer;
   j) repeating one or more of steps e-i) until a user determines that the updated geobody model is satisfactory, and
   k) using said updated geobody model in producing fluids from said reservoir.

2. The method of claim 1), wherein said algorithm selects sealed horizon pairs by:
   i) creating a stack count array;
   ii) walking the stack count array and assigning a unique number to each connected area containing the same number of Z value pairs that match a user-defined fitting criteria;
   iii) assigning numerical patch identifiers to each Z value pair;
   iv) compared adjacent numerical patch identifiers;
   v) connecting patches in order of connection strength;
   vi) assigning each set of connected patches to a horizon pair; and
   vii) sealing horizon pairs by applying a 3×3 digital filter that scans top horizons for a null value and replaces each null value with an average of neighboring non-null top and bottom values.

3. The method of claim 1, wherein said sealed horizon pairs are chosen to define said volume.

4. The method of claim 1, wherein one or more boundaries of said geobody model are being corrected.

5. The method of claim 1, wherein an internal feature of said geobody model is being corrected.

6. The method of claim 1, wherein Boolean operations are used to incorporate said smoothed mesh into said salt model.

7. A computer-implemented method for modifying a model of a salt structure in a reservoir, comprising:
   a) uploading seismic data from a reservoir containing a salt structure into a 3D modeling program on a computer and generating a cube display model having horizons inserted into the model volume;
   b) selecting at least one top and one bottom horizon pair in said cube display model to define a volume representing a salt model having a boundary and displaying said salt model on a display;
   c) comparing said seismic data and said displayed salt model to identify at least one incorrect area on the boundary of said salt model;
   d) marking on said displayed salt model at least one point in said incorrect area of said displayed salt model to generate a mesh that intersects said at least one point in said incorrect area;
   e) expanding said mesh to connect to said salt model and creating an updated salt model;
   f) automatically generating a set of sealed horizon pairs for said updated salt model and storing said set of sealed horizon pairs in a memory in said computer;
   g) repeating one or more of steps b)-f) until a user is satisfied with the updated salt model;
   h) storing said updated salt model in said computer; and
   i) using said updated salt model to produce fluids from said reservoir.

8. The method of claim 7, wherein step f) comprises:
   i) creating a stack count array;
   ii) walking the stack count array and assigning a unique number to each connected area containing the same number of Z value pairs that match a user-defined fitting criteria;
   iii) assigning numerical patch identifiers to each Z value pair;
   iv) compared adjacent numerical patch identifiers;
   v) connecting patches in order of connection strength;
   vi) assigning each set of connected patches to a horizon pair;
   vii) sealing horizon pairs by applying a 3×3 digital filter that scans top horizons for a null value and replaces each null value with a average of neighboring non-null top and bottom values.

9. The method of claim 7, wherein said sealed horizon pairs are chosen to define said volume.

10. The method of claim 7, wherein one or more boundaries of said salt model are being corrected.

11. The method of claim 7, wherein an internal feature of said salt model is being corrected.

12. The method of claim 7, wherein Boolean operations are used to incorporate said edited mesh into said salt model.

13. The method of claim 8, wherein step d can include one or more of the following:
   a) marking a new control point;
   b) moving a control point;
   c) deleting a control point; or
   d) tuning mesh-generation parameters.

14. A computer-implemented method for modifying a model of a salt or other geobody structure, comprising:
   a) marking at least one point in an incorrect area of a displayed salt or geobody model to generate a mesh that intersects said at least one point in said incorrect area;

b) expanding said mesh to connect to said salt or geobody model thus creating an updated model;
c) automatically generating a set of sealed horizon pairs for said updated model and storing said set of sealed horizon pairs in a memory disk in a computer, wherein said sealed horizon pairs are generated by:
  i) creating a stack count array;
  ii) walking the stack count array and assigning a unique number to each connected area containing the same number of Z value pairs that match a user-defined fitting criteria;
  iii) assigning numerical patch identifiers to each Z value pair;
  iv) compared adjacent numerical patch identifiers;
  v) connecting patches in order of connection strength;
  vi) assigning each set of connected patches to a horizon pair;
  vii) sealing horizon pairs by applying a 3×3 digital filter that scans top horizons for a null value and replaces each null value with a average of neighboring non-null top and bottom values;
d) repeating at least steps a and b until a user is satisfied with the updated model; and
e) using said updated model in producing fluids from said reservoir.

15. The method of claim 14, wherein said fitting criteria is 3-5 criteria.

16. The method of claim 14, wherein step a) can include one or more of the following:
  a) marking a new point;
  b) moving an existing point;
  c) deleting an existing point; or
  d) tuning mesh-generation parameters.

17. The method of claim 14, including the further step of printing, displaying or saving the results of the method.

18. A printout or 3D display of the results of the method of claim 14.

19. A non-transitory machine-readable storage medium containing or having saved thereto the results of the method of claim 14.

20. The method of claim 14, further including the step of using said results in a reservoir modeling program to predict reservoir performance characteristics.

* * * * *